United States Patent
Vainer et al.

[15] 3,686,504
[45] Aug. 22, 1972

[54] PHOTO-ELECTRIC OUTLINE-FOLLOWING APPARATUS FOR CONTROLLING THE MOVEMENT OF AN OPERATIVE UNIT

[72] Inventors: Shimon Abramovich Vainer, Logovskaya 43, kv. 21; Savely Abramovich Vainer, Grodnenskaya 10, kv. 25, both of Volgograd, U.S.S.R.

[22] Filed: June 25, 1971

[21] Appl. No.: 156,654

[52] U.S. Cl. ................................. 250/202, 318/577
[51] Int. Cl. ............................................. G06k 11/02
[58] Field of Search ....................... 250/202; 318/577

[56] References Cited

UNITED STATES PATENTS

| | | | |
|---|---|---|---|
| 2,853,626 | 9/1958 | Wetzel | 250/202 |
| 3,267,285 | 8/1966 | Greanias et al. | 250/202 |

*Primary Examiner*—James W. Lawrence
*Assistant Examiner*—T. N. Grigsby
*Attorney*—Holman & Stern

[57] ABSTRACT

The invention relates to photo-electric outline-following apparatuses for controlling the movement of an operative unit.

The characteristic feature of the apparatus is that it comprises special units for automatic inertial correction of the outline-following errors. This ensures that in the process of outline-following scan diameter is constantly aligned with the drawing outline even when the parameters of the servo systems drift by a large amount due to the presence of disturbing factors.

As a result the accuracy, dynamic and operating stability of the apparatus has been considerably improved so that apart from the traditional uses the apparatus can now be employed for automation of metal-cutting machines, conversion of information from graphical to digital form, etc.

3 Claims, 3 Drawing Figures

PHOTO-ELECTRIC OUTLINE-FOLLOWING APPARATUS FOR CONTROLLING THE MOVEMENT OF AN OPERATIVE UNIT

The invention relates to photo-electric outline-following apparatus for controlling the movement of an operative unit and may be used viz. in welding machines for thermal cutting of sheet metal, metal-cutting machines and in data processors for conversion of information from graphical to digital form.

The known photo-electric outline-following apparatuses can be roughly divided into two classes depending on the method they employ to measure the basic geometrical parameters of the outline being followed.

The first class includes the apparatuses in which measurement is performed by a compensation method, i.e. any disturbance caused by the departure or turning of the outline from the center "0" of the scanning zone (Fig. 1) upsets the equilibrium of a servo system.

While minimizing the resultant error signal such apparatuses turn through a corresponding angle a photo-electric pick-off or its moving portion and the mechanism controlling the speeds of the co-ordinate motors coupled to said pick-off.

The second class includes pulse-type systems which directly measure the controlling angle parameters $\alpha$ and $\beta$, specifying the direction of the outline within the scanning zone and its departure $\Delta$ from the scanning zone center.

In most of the known apparatuses the controlling signal is fully specified by the angle $\beta$ between the line "0" connecting the center "0" of the scanning zone with the point "A" on the forward half of the scanning zone where the scanning zone boundary intersects the outline "M" being followed and the selected reference direction (axis $x$).

The angle $\beta$ specifies both the direction of the outline and its departure from the center "0" of the scanning zone.

In other apparatuses the direction of the outline within the scanning zone and its departure $\Delta$ from the center "0" of the scanning zone are measured separately. In this case the direction of the outline is specified by the angle $\alpha$ between the line which connects the points "A" and "B" on the forward and rear halves of the scanning zone zone where the latter intersects the outline and the selected reference direction, while the departure $\Delta$ is specified by the angle $\gamma$ between this line and the radius drawn from the center "0" of the scanning zone to the point "A."

In such apparatuses the results of measurement of the outline direction and the departure of the outline from the scanning zone center are summed up to produce a controlling action proportional to the angle $\beta = \alpha + \gamma$.

An essential disadvantage of such apparatuses is that they are subject to errors which appear when the distribution of the signals which control the co-ordinate motors fails to comply with the required law. Such failures may be caused, among other things, by non-linearity of the characteristics of the motor drives, unequal gain of the circuits which control the drives, zero drift of the servo systems, variation of the gain of the circuits which sum up the signals corresponding to the direction of the outline and its departure from the scanning zone center, etc.

Such disadvantages affect the accuracy and stability of the known outline-following apparatus and therefore restrict the field of their application.

The object of the present invention is to avoid these disadvantages by providing a photo-electric outline-following apparatus which provides automatic correction of the following errors irrespective of the factors which cause them and has a high operating and dynamic stability.

With this object in view, a photo-electric outline-following apparatus for controlling the movement of an operative unit comprising a surface bearing the outline of the pattern being followed mechanically coupled to a controlled head, a photo-electric cell accepting light signals from the scanned portion of the outline, a means for measuring geometrical parameters of the outline within the scanning zone accepting electric signals from the photo-electric cell, a means for measuring the departure of the scanning zone center from the outline also accepting electric signals from the photo-electric cell, a functional converter converting the signals furnished by said means for measuring geometrical parameters of the outline within the scanning zone and the departure of the scanning zone center from the outline to controlling signals and coordinate drives moving the controlled operative unit is, according to the invention, provided with a circuit converting the signals furnished by the means for measuring the departure of the scanning zone center from the outline to a smoothly rising D.C. voltage applied to the functional converter which is also fed with the signals from the means for measuring the geometrical parameters of the outline, whose output is simultaneously fed to the means for measuring the departure of the scanning zone center from the outline.

It is preferable that in the photo-electric apparatus directly measuring the controlling vector which comprises a means for measuring the geometrical parameters of the outline with a closed optical scan of a light beam, a means for measuring the departure of the center of the scanning zone formed by rotation of a light beam from the pattern outline and a functional converter converting the signals furnished by said means to controlling signals according to the invention the circuit which furnishes a smoothly rising D.C. voltage when the scanning zone center departs from the pattern outline is designed as an integrating network, while the functional converter is designed in the form of a controlled phase-shifting circuit.

It is likewise preferable that in the photo-electric outline-following apparatus directly measuring the controlling vector with a time selector for sampling and converting one of the scan pulses, said time selector being the means for measuring the geometrical parameters of the pattern outline, according to the invention, the means for measuring the departure of the scanning zone center from the pattern outline comprises an anti-coincidence circuit, a driven saw-tooth generator and a pulse-type phase-sensitive detector, and the controlled phase-shifting circuit comprises a driven square-wave generator and a frequency filter. In this case one of the outputs of the time selector is connected to the inputs of the driven generators of saw-tooth and square waves the output of the driven saw-tooth generator is connected to one of the inputs of the pulse-type phase-sensitive detector whose other input is connected to the output of the anti-coincidence circuit, one of the inputs of which being connected to the input, and the other input to the output, of the time selector, the output of the pulse-type phase-sensitive detector is connected to the input of the integrating network, the output of which is connected to the other input of the squarewave generator of the phase-shifting circuit.

The photo-electric outline-following apparatus described herein makes it possible to machine workpieces to a higher accuracy and manufacture finished parts which require no subsequent treatment. This apparatus may be used for assembly operations and is quite competitive with digital control systems of more complicated design.

The photo-electric outline-following apparatus described herein is simple and reliable in operation and permits the workpiece machining programme to be prepared or changed more quickly than in the known apparatuses.

The accuracy of the present photo-electric outline-following apparatus for the 1:1 scale is ±0.02 mm.

The economy provided by one experimental apparatus in single-shift operation during one year was 10,000 rubles when the apparatus was used for gas-cutting and 3,000 rubles when it was used for machining of workpieces in a turning lathe.

The invention will be better understood from the following description of its specific embodiment when read in connection with the accompanying drawings in which.

Figure 1:
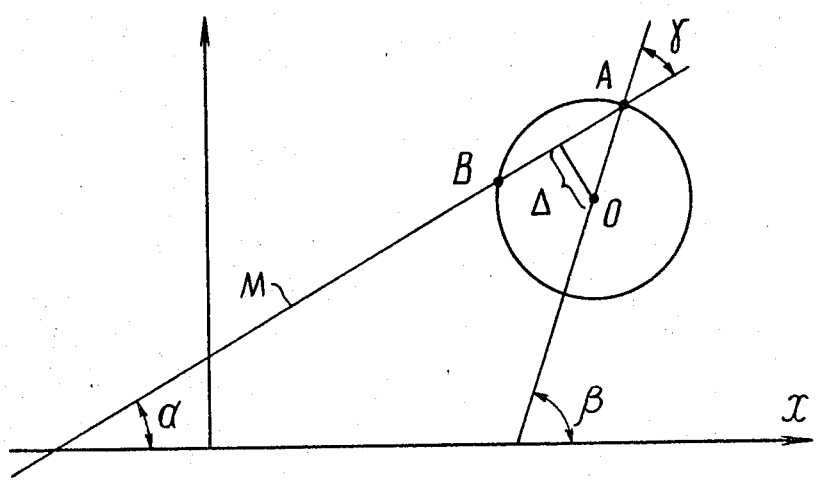
FIG. 1 is a graph showing the possible positions of the scanning zone with respect to the outline being followed.
Figure 2:
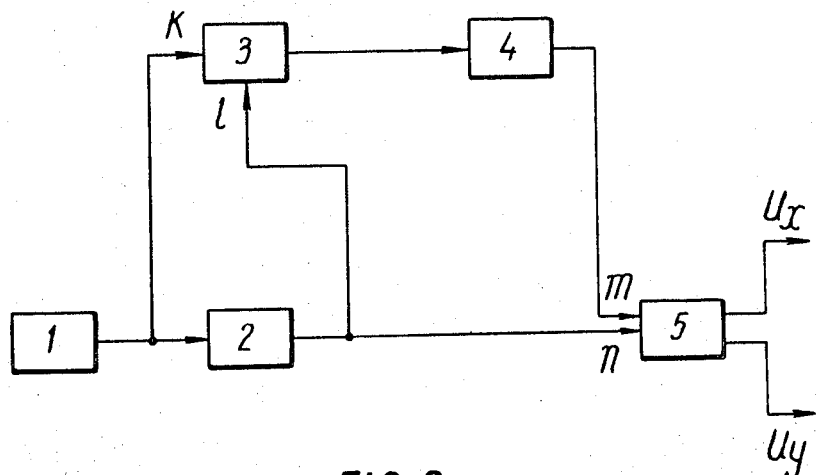
FIG. 2 is a block diagram of the photo-electric outline-following apparatus, according to the invention.

The apparatus for controlling an operative unit described herein comprises a photo-electric cell (FIGS. 1 and 2); a means 2 for measuring the geometrical parameters of the pattern outline "M" within the scanning zone; a means 3 for measuring the departure of the center "0" of the scanning zone from the outline "M", a circuit 4 for converting the signals of the means 3 for measuring the departure of the center "0" of the scanning zone from the outline "M" to a smoothly rising D.C. voltage and a functional converter 5 with two inputs "$n$" and "$m$." The input "$n$" of the functional converter 5 is connected to the output of the means 2 for measuring the geometrical parameters of the outline "M" and the other input "$m$" is connected to the output of the circuit 4 converting the signals of the means 3 for measuring the departure of the center "0" of the scanning zone from the outline "M."

The output of the photo-electric cell 1 is connected to the input of the means 2 for measuring the geometrical parameters of the outline "M" and to the input "$k$" of the means 3 for measuring the departure of the center "0" of the scanning ring from the outline "M," the input "1" thereof being connected to the output of the means 2 for measuring the geometrical parameters of the outline "M."

The photo-electric outline-following apparatus described herein operates as follows.

The electric signal $U_1 = f(\alpha, \gamma)$ is applied from the photo-electric cell to the input of the means 2 for measuring the geometrical parameters of the outline "M" and to the input "$k$" of the means 3 for measuring the departure of the center "0" of the scanning zone from the outline "M."

The means 2 for measuring the geometrical parameters furnishes signals corresponding to the angle $\beta = \alpha + \gamma$ to the first input "$n$" of the functional converter 5.

The means 3 for measuring the departure of the scanning zone center furnishes the signal $U_2$ proportional to the extent of the departure $\Delta$ of the scanning zone center "0" from the outline "M." The signal $U_2$ is fed to the circuit 4 which converts it to a smoothly rising D.C. voltage. The circuit 4 may be designed as viz. an integrating or inertial network.

The signal $U_3 = \int k\Delta dt$ where K is a coefficient, is applied to the second input "$m$" of the functional converter 5. The functional converter 5 furnishes the signals $U_x$ and $U_y$ controlling the coordinate motors (not shown in FIGS. 1 and 2).

When the departure of the center "0" of the scanning zone from the outline being followed is not equal to zero a smoothly rising D.C. voltage $U_3$ applied to the second input "$m$" of the functional converter 5 automatically corrects the outline-following error without affecting the marginal stability of the apparatus, and its operational stability in the presence of any disturbances which affect the signals $U_x$ and $U_y$ controlling the co-ordinate motors.

Figure 3:
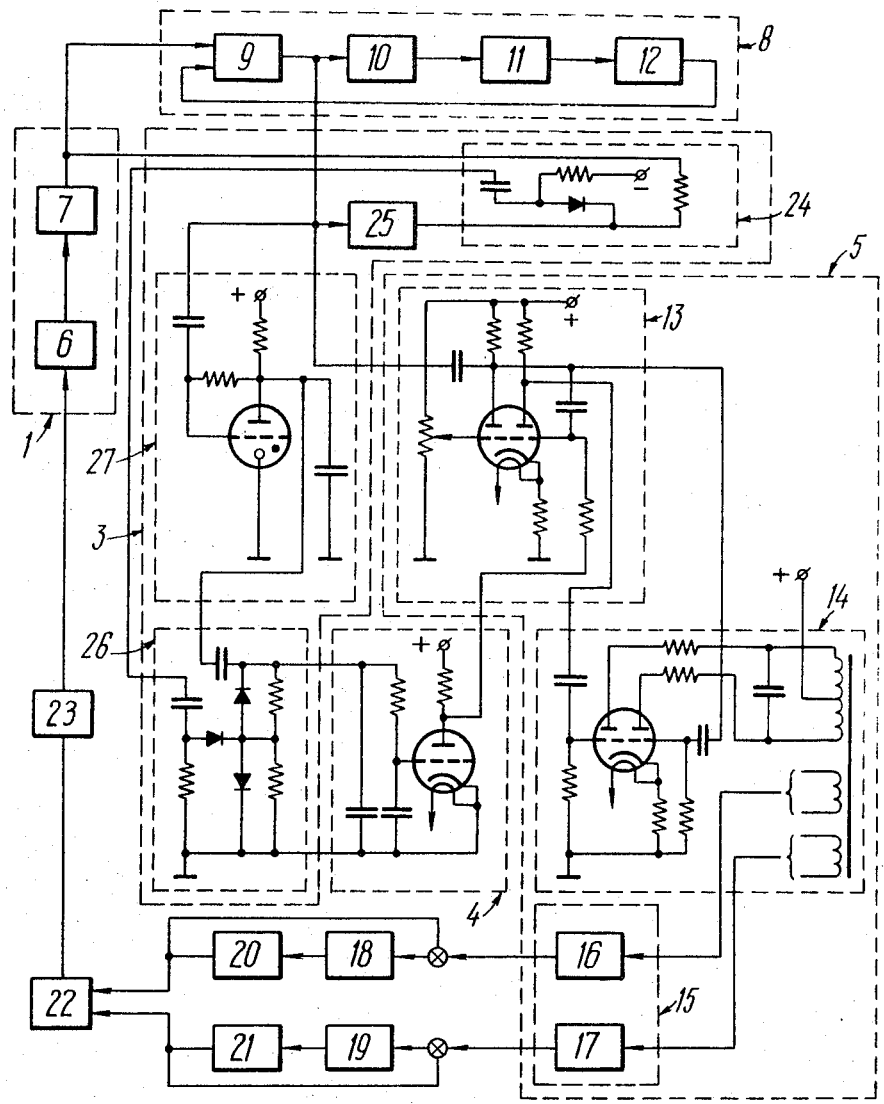
FIG. 3 is a schematic diagram of a photo-electric outline-following apparatus according to the invention.

The schematic diagram (FIG. 3) shows all basic components of the preferred embodiment of the invention disclosed herein.

The apparatus comprises a photo-electric cell 1 including a photo-pick-off 6 with a circular optical scan and an amplifying-shaping circuit 7, a time selector 8 which is a means for measuring the geometrical parameters of the pattern outline with a phase feedback, formed by series-connected coincidence circuit 9, multivibrator 10, filter 11 and shaping circuit 12, the output of which is connected to the second input "P" of the coincidence circuit 9.

The output of the coincidence circuit 9 which is one of the outputs of the time selector 8 is connected to a controlled phase-shifting circuit 5 formed by a driven multivibrator 13 functioning as a driven square-wave generator and a frequency filter 14. The output of the controlled phase-shifting circuit 5 is connected to a sine-cosine distributor 15 formed by phase-sensitive detector 16 and 17. The phase-sensitive detectors 16 and 17 are connected to, respectively, power amplifiers 18 and 19 supplying power to co-ordinate motors 20 and 21 which drive an operative unit 22 mechanically coupled to a copying table 23.

Connected to the output of the coincidence circuit 9 is the means 3 for measuring the departure of the scanning zone center which is formed by an anti-coincidence circuit 24, an inverter 25 and a pulse-type phase-sensitive detector 26.

One of the inputs of the anti-coincidence circuit 24 is connected to the amplifying-shaping circuit 7, while its other input is coupled through the inverter 25 to the output of the coincidence circuit 9.

The output of the anti-coincidence circuit 24 is connected to the pulse-type phase-sensitive detector 26, the second input thereof being connected to the output of the driven saw-tooth generator 27.

The output of the pulse-type phase-sensitive detector 26 is connected through the integrating circuit 4 to the second input of the driven multivibrator 13 in the controlled phase-shifting circuit 5.

This apparatus operates as follows.

The photo-current pulses at the frequency of 100 Hz developed by the photo-electric pick-off 6 (at the supply current frequency of 50 Hz when the optical scan intersepts the outline being followed are applied to the input of the amplifying-shaping circuit 7 the output of which is coupled to one of the inputs "Q" of the coincidence circuit 9.

The pulses generated at the point "A" by the forward half of the scanning zone (in the direction of travel) where it intersects the outline are applied from the coincidence circuit 9 to the input of the multivibrator 10 synchronizing the latter. The voltage furnished by the multivibrator 9 is converted by the filter 11 to a nearly sinusoidal wave which is then converted by the shaping circuit 12 to a gating pulse of a definite duration and phase. The gating pulse is applied to the second input "P" of the coincidence circuit 9 providing the sampling of the pulse generated by the forward half of the scanning zone in the direction of travel.

The pulses furnished by the coincidence circuit 9 are also applied to one of the inputs of the driven multivibrator 13 in the controlled phase-shifting circuit 5. The square wave furnished by the driven multivibrator 13 is converted by the frequency filter 14 to a nearly sinusoidal wave which is then converted by the phase-sensitive detectors 16 and 17 of the sine-cosine distributor 15 to two D.C. signals $U_x$ and $U_y$ amplified by the amplifiers 18 and 19, respectively. The power amplifiers supply the coordinate motors 21 and 22 which move the operative unit 22 and the copying table 23 coupled with it in the direction determined by the direction of the outline being followed.

The output pulses of the coincidence circuit 9 synchronize operation of the driven saw-tooth generator 27 and after inversion are applied to one input of the anti-coincidence circuit 24, the other input of which receives pulses from the amplifying-shaping circuit 7. Owing to this, the anti-coincidence circuit 24 samples the photo-current pulse corresponding to the point "B" where the rear half of the scanning zone intersects the outline. These pulses are applied to one of the inputs of the phase-sensitive detector 26, the other input of which receives square waves from the generator 27.

The output of the phase-sensitive detector 26 is applied through the integrating network 4 to the second input of the driven multivibrator 13. When the center "0" of the scanning zone is aligned with the axis of the outline "M" being followed, the phase-shift between the pulses corresponding to the points "A" and "B" of the scan is equal to 180°. At such time the pulses coming from the anti-coincidence circuit 24 are located in the middle of the slanting portion of the saw-tooth wave produced by the generator 27 and the D.C. voltage at the output of the pulse-type phase-sensitive detector 26 is zero. When the center "0" of the scan departs from the axis of the outline "M" the phase shift between the pulses corresponding to the points "A" and "B" is other than 180° and a D.C. voltage appears at the output of the pulse-type phase-sensitive detector 26. The magnitude of this voltage depends on the extent of the departure Δ of the scan center o from the axis of the outline "M," the voltage sign, on the direction of departure.

This D.C. voltage is applied to the integrating newwork 4 which furnishes a smoothly varying correcting voltage to control the duration of the square-wave pulses generated by the driven multivibrator 13.

As a result the phase of the voltage at the output of the frequency filter 14 changes, the controlling signals $U_x$ and $U_y$ at the output of the phase-shifting circuit 5 change accordingly and the corresponding controlling action is applied to the co-ordinate motors 20 and 21 and to the operative unit 22.

What we claim is:

1. A photo-electric outline-following apparatus for controlling the movement of an operative unit, comprising a surface bearing the outline of the pattern being followed mechanically coupled to the operative unit; a photo-electric cell accepting light signals from the scanned portion of the outline; a means for measuring the geometrical parameters of the outline within the scanning zone, accepting electric signals from said photo-electric cell; a means for measuring the departure of the scanning zone center from the outline, also accepting electric signals from said photo-electric cell; a functional converter converting the signals furnished by said means for measuring the geometrical parameters of the outline within the scanning zone and the departure of the scanning zone center from the outline to controlling signals; a circuit converting the signals furnished by the means for measuring the departure of the scanning zone center from the outline to a smoothly rising D.C. voltage applied to one of the inputs of said functional converter; said means for measuring the geometrical parameters of the outline within the scanning zone, the output signals of which are applied to said means for measuring the departure of the scanning zone center from the outline and to the other input of said functional converter; co-ordinate motor drives moving the controlled operative unit, which accept said controlling signals from said functional converter.

2. A photo-electric outline-following apparatus according to claim 1, directly measuring the controlling vector, comprising a means for measuring the geometrical parameters of an outline being followed with the closed optical scan of a light beam, wherein the signals furnished by the means for measuring the departure of the scanning zone center from the outline are converted to a smoothly rising D.C. voltage by an integrating circuit and controlled phase-shifting circuit serves an a functional converter;

3. A photo-electric outline-following apparatus according to claim 2 with a time selector functioning as a means for measuring the geometrical parameters of an outline being followed to sample and convert one of the pulses generated by the scan, wherein the means for measuring the departure of the scan center from the outline is formed by an anti-coincidence circuit, a driven saw-tooth generator and a pulse-type phase-sensitive detector and the controlled phase-shifting circuit is formed by a driven square-wave generator and a frequency filter, so that one of the inputs of the time selector is connected to the inputs of the driven saw-tooth and square-wave generators, the output of the driven saw-tooth generator is connected to one of the inputs of the pulse-type phase-sensitive detector, the other input of said detector being connected to the output of the anti-coincidence circuit, one of the inputs of which is connected to the input, and the other input, to the output, of a time selector, the output of the pulse-type phase-sensitive detector is connected to the input of the integrating circuit, the output of which is connected to the other input of the driven square-wave generator in the phase-shifting circuit.

* * * * *